(12) United States Patent
Tsui et al.

(10) Patent No.: US 7,472,152 B1
(45) Date of Patent: Dec. 30, 2008

(54) ACCOMMODATING FOURIER TRANSFORMATION ATTENUATION BETWEEN TRANSFORM TERM FREQUENCIES

(75) Inventors: James B. Y. Tsui, Dayton, OH (US); David M. Lin, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 844 days.

(21) Appl. No.: 10/914,712

(22) Filed: Aug. 2, 2004

(51) Int. Cl.
*G06F 15/00* (2006.01)

(52) U.S. Cl. ...................................... 708/403

(58) Field of Classification Search .................. 708/403, 708/404, 405
See application file for complete search history.

(56) References Cited

U.S. PATENT DOCUMENTS

| | | | |
|---|---|---|---|
| 4,965,761 A * | 10/1990 | Schlunt | 708/405 |
| 5,272,446 A * | 12/1993 | Chalmers et al. | 329/304 |
| 5,347,284 A | 9/1994 | Volpi et al. | |
| 5,473,555 A | 12/1995 | Potter | |
| 6,133,873 A | 10/2000 | Krasner | |
| 6,349,120 B1 * | 2/2002 | Shi et al. | 375/316 |
| 6,366,599 B1 | 4/2002 | Carlson et al. | |
| 6,466,958 B1 | 10/2002 | Van Wechel et al. | |
| 6,606,047 B1 | 8/2003 | Börjesson et al. | |
| 6,690,666 B1 | 2/2004 | Norrell et al. | |
| 6,711,221 B1 | 3/2004 | Belotserkovsky et al. | |

* cited by examiner

*Primary Examiner*—Chuong D Ngo
(74) *Attorney, Agent, or Firm*—AFMCLO/JAZ; Gerald B. Hollins

(57) ABSTRACT

A Fourier transformation algorithm implementation in which accommodation is provided for the output attenuation occurring when an input signal falls intermediate two terms of the transformation output series in its frequency. Corrected Fourier transformation terms, achieved by combining the magnitudes of attenuated Fourier transformation terms generated by the input signal at Fourier transformation frequencies distant to the input signal frequency, in either a vectorial or a scalar combination, are substituted for an attenuated Fourier transformation term according to the invention. Noise correction of the substitute Fourier transformation terms is also provided. The invention is disclosed through use of a global position system signal example that is subjected to a double Fourier transformation filtering process to enhance the incoming signal to noise ratio. Normally occurring 3.9 decibel attenuations in each Fourier transformation step are reduced to about 0.9 decibel each through use of the invention.

22 Claims, 7 Drawing Sheets

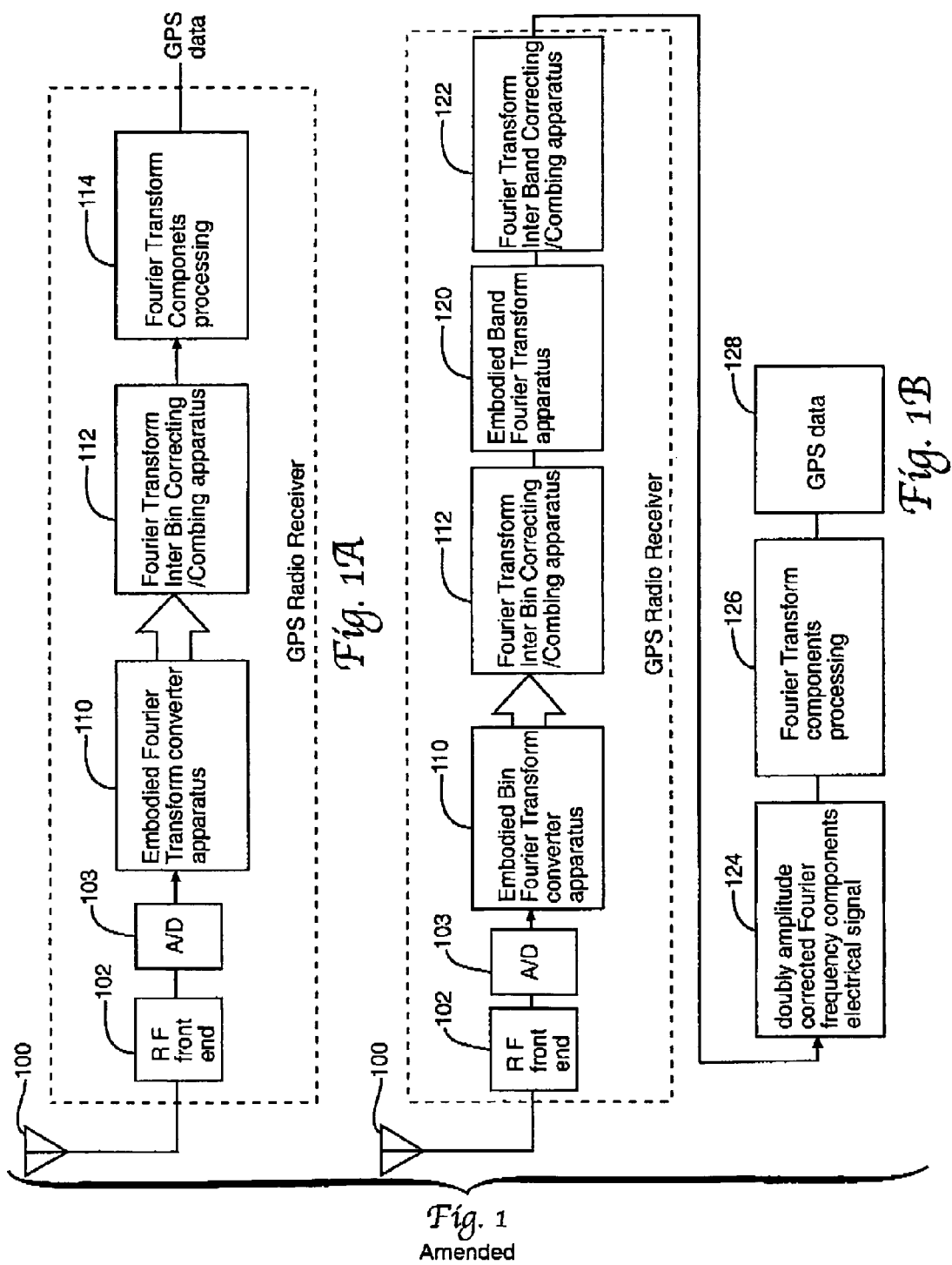
Fig. 1
Amended

ACCOMMODATING FOURIER TRANSFORMATION ATTENUATION BETWEEN TRANSFORM TERM FREQUENCIES

RIGHTS OF THE GOVERNMENT

The invention described herein may be manufactured and used by or for the Government of the United States for all governmental purposes without the payment of any royalty.

BACKGROUND OF THE INVENTION

When computing the Fourier transformation of a mathematical function or of the waveform representing an electrical signal it is necessary to select the number of "points" or locations in the waveform at which the Fourier transformation coefficients will be determined. Alternately this selection may be expressed as a need to determine in advance the number of terms to be included in the Fourier series used to represent the waveform or the signal in the transform output. Thus it is common practice to speak of for example a ten point or a one hundred point or a two hundred fifty six point Fourier transformation. Each such point of the achieved Fourier transformation includes a coefficient magnitude for a component frequency in the sought-after Fourier series representing the mathematical function or the waveform.

The Fourier transformation accomplished in this manner has in effect performed the function of filtering the input signal of the receiver or other apparatus employing the Fourier transformation operation into a number of frequency components or frequency bins of predetermined frequency location. The Fourier series summation of these frequency components or frequency bins is of course a representation of the original input signal in the frequency domain, a representation made up of components having the selected frequencies of the frequency bins. In the present invention the relationship between an incoming signal frequency and the selected location of these frequency bins is considered using the example of a global position system receiver.

The expression "frequency bin" is widely used in referring to the terms of a Fourier transformation series. In keeping with this practice, and in extension thereof, the terms "frequency bin" and "frequency band" are employed in the present document in situations wherein it is helpful to segregate the results of the first and second Fourier transformation operations employed. Although this practice essentially recognizes generic and specific meanings for the term "frequency bin" it is believed that adjacent language provides clarifying segregation in each instance herein.

When discrete Fourier transform (DFT) or fast Fourier transform (FFT) methods are used for global position system signal or other signal acquisition purposes, it is found that if the input signal frequency happens to be located "on" the frequency of a Fourier transformation term, i.e., on a frequency bin frequency, then the amplitude of the acquired signal output from the Fourier transformation has a maximum value. When the acquired frequency is displaced from a frequency bin location however (since the input signal may occur at any frequency in the spectrum under consideration and since the Fourier transformation frequencies are fixed once the algorithm is implemented) the acquired signal may generate output responses in more than one nearby frequency bin however each such response is diminished in magnitude with respect to what it would have been if located on a frequency bin frequency. In such instances the Fourier transformation output magnitude is decreased or attenuated, possibly to an undesirable or intolerable degree. Such attenuation is especially undesirable in a signal acquisition situation where it may cause an already weak signal to remain lost in a noise background. For the sake of identification and easy referral this input frequency to Fourier transformation frequency difference difficulty is herein referred-to by the name of "frequency offset signal attenuation" or similar names. The present invention addresses this difficulty.

When an input signal is located midway intermediate two frequency bins a worst-case frequency offset attenuation situation of interest in the present invention exists. When this midway frequency relationship occurs, the most affected Fourier transformation component incurs a 3.92 dB (i.e., 20×log (0.6366)) loss in amplitude. This amplitude loss may also be described as a receiver sensitivity loss, a loss of the same 3.92 dB in magnitude. It is often highly desirable to recover some of this loss in order to achieve desirable GPS receiver system performance. The present invention is believed to provide a desirable resolution of this difficulty.

SUMMARY OF THE INVENTION

The present invention provides accommodation for signal attenuation occurring when an input signal frequency is displaced from the frequencies established during a Fourier transformation input signal frequency filtering operation.

It is therefore an object of the present invention to provide a method and an apparatus for computing enhanced Fourier transformation coefficients for input signals falling intermediate Fourier transformation frequencies.

It is another object of the invention to provide Fourier transformation signal processing avoiding between-Fourier frequency attenuation of the output signals obtained from Fourier transformation algorithms.

It is another object of the invention to provide Fourier transformation signal processing avoiding between-Fourier frequency attenuation of output signals occurring in a plurality of frequencies intermediate center frequencies of terms in a Fourier transformation algorithm.

It is another object of the invention to provide Fourier transformation signal processing avoiding between-Fourier frequency attenuation of output signals occurring in at lease five frequencies intermediate frequencies of a Fourier transformation series.

It is another object of the invention to provide a dual Fourier transformation signal acquisition arrangement for a global position system receiver.

It is another object of the invention to provide a dual Fourier transformation signal acquisition arrangement for a global position system receiver wherein each Fourier transformation is provided with compensation for between transformation term frequency related signal attenuations.

It is another object of the invention to provide Fourier transformation signal processing employing a combination of Doppler frequency offset-attenuated Fourier transformation coefficients.

These and other objects of the invention will become apparent as the description of the representative embodiments proceeds.

These and other objects of the invention are achieved by Fourier transformation signal processing apparatus accommodating input signal frequency to Fourier transformation term frequency offset-induced, transformation term attenuation, said apparatus comprising the combination of:

an embodied Fourier transformation algorithm connected to said input signal and computing terms of a Fourier transformation series wherein each series term defines a center frequency in a bin in an array of Fourier transformation overlapping frequency bins;

each term of said Fourier transformation series including a coefficient of magnitude determined by said input signal strength and also of magnitude determined by a frequency offset responsive bin relationship between said input signal frequency and frequencies of a most adjacent pair of Fourier transformation terms;

combining apparatus responsive to a coefficient portion of said Fourier transformation series terms disposed at frequencies proximate said input signal, in two adjacent of said frequency bins;

said combining apparatus generating a corrected replacement larger Fourier transformation coefficient usable for enhanced accuracy transform representation of an input signal coefficient located intermediate said most adjacent pair of Fourier transformation terms bin center frequencies.

BRIEF DESCRIPTION OF THE DRAWING

The accompanying drawings incorporated in and forming a part of the specification, illustrate several aspects of the present invention and together with the description serve to explain the principles of the invention. In the drawings:

FIG. 1 shows in FIG. 1A and FIG. 1B two radio receivers incorporating present invention apparatus; in these drawings:

FIG. 1A shows a global position system receiver wherein present invention offset signal frequency correcting Fourier transformation filtering of a single frequency correction type may be used; and FIG. 1B shows a global position system receiver wherein present invention offset signal frequency correcting Fourier transformation filtering of a tandem frequency correction type may be used.

DETAILED DESCRIPTION OF THE INVENTION

Figure 2:
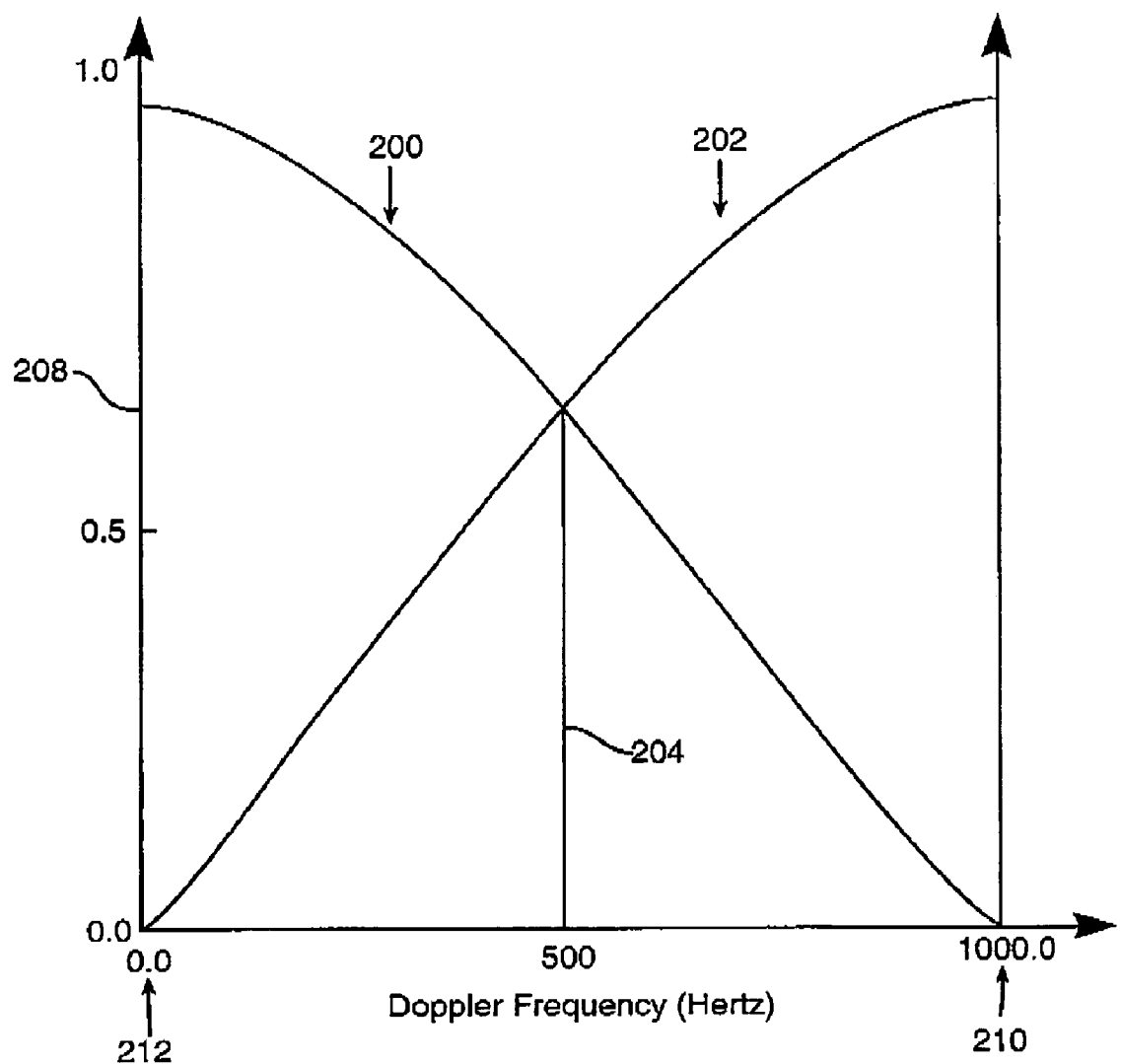
FIG. 2 shows an amplitude versus frequency diagram for global position system input signal falling between two Fourier transformation frequency bins.

In order to "acquire" a GPS signal a GPS receiver ascertains two characteristics of the incoming radio frequency signal; these characteristics are a determination of the initial phase of the signal's coarse acquisition (C/A) code and a determination of the Doppler frequency component of the incoming signal's frequency. This Doppler frequency component is the portion of incoming signal frequency attributable to the relative movement of the GPS signal source satellite and the platform on which the signal-receiving radio receiver is located. The radio frequency of the GPS signal carrier is of course known in advance so that it is only this Doppler component of the incoming signal that is variable as a result of the relative movements. For many GPS receiving systems and their end uses a Doppler component falling within the maximum range of 5 kilohertz is realistic; in the present invention however we allow for the characteristics of a high performance aircraft and therefore consider the Doppler effect to have a possible magnitude of +/−5 kilohertz or a total of 10 kilohertz of frequency range.

For present invention purposes we assume the determination of the initial phase of the incoming signal's coarse acquisition (C/A) code has been previously accomplished and this code has been "striped off" of the incoming signal by way of a code matching or other process, i.e., by one of the processes disclosed in the several references identified subsequently herein. After this "stripping off" there remains the task of identifying the magnitude of the Doppler frequency component of the incoming signal, an identification comprising determination of which of a number of predetermined increments of Doppler frequency is closest to the received Doppler signal. In other words such identification involves determination of which of number of predetermined "frequency bands", bands that are located within an array of "frequency bins," the incoming signal's Doppler component falls within. As implied by these statements an attempt is made in the present document to segregate a first Fourier transformation of 1 kilohertz resolution from a second Fourier transformation of 100 Hertz resolution and operative on an output signal of the first transformation through use of the term "bin" with respect to the first transformation and its results and use of the term "band" with respect to the second transformation and its results. Moreover the terms in a Fourier transformation series expression are referred-to herein by way of the mathematically oriented names of a numerical "coefficient" portion and an "exponential" portion; the latter including the usual kernel function operator.

The Fourier series terms in the output signals of the first and second Fourier transformation operations discussed herein define the location of bin and band center frequencies in the Fourier transformation outputs. The use of first and second Fourier transformation operations in the filtering or coherent integration of the present invention is advantageous because of the greater frequency resolution achieved with a two-transformation process in comparison with that of a single transformation process. Other advantages of the present invention two-Fourier transformation operation include improved receiver sensitivity.

FIG. 1 in the drawings shows a block diagram for two simplified representative global position system receivers in which the present invention can be used to at least signal acquisition advantage. In each FIG. 1 block diagram input signals are received from an antenna 100, amplified, filtered and down converted through a RF front end 102, digitized in an A/D converter 103, and filtered in a Fourier transformation signal converter apparatus 110. In the Fourier transformation filtering components processing at 114 several characteristics including, the timing of the initial phase of C/A code and the value of the Doppler frequency component are computed.

Prior to the Fourier transformation processing of block 114 in the FIG. 1 drawings the Fourier transformation converter output signals from the block 110 transformations in each of the FIG. 1A and FIG. 1B drawings are corrected for the frequency offset attenuation considered in the present invention. This occurs in the blocks 112 of FIG. 1 and in a manner believed best described with the aid of waveforms appearing in the FIG. 2 and ensuing drawings herein. Notably the names "bin" and "band" are used to distinguish the first and second transformations appearing in the double transformation, greater frequency resolution, FIG. 1B receiver.

Two Fourier transformation filters, one relating to coarse frequencies of, for example, 1 kilohertz segregation and one to finer 100 Hertz resolution segregations are thus preferably used in the GPS receiver environment of the present invention in order to achieve the desired detection sensitivity. Such an arrangement is shown in the "doubly periodic" system appearing in the FIG. 1B drawing of FIG. 1. The FIG. 1 receivers-provided enhanced sensitivity is needed for the relatively weak signals and the low signal to noise ratio environment often incurred in the GPS system. Excepting for the addition of a second Fourier transformation and related blocks 120 and 122 the receivers of FIG. 1A and FIG. 1B are similar. The signals intermediate the blocks of the FIG. 1A and FIG. 1B receivers are of course inherently electrical in nature in view of the radio receiver nature of the represented apparatus.

Weak GPS signals prevail particularly in urban environments where building shielding and other signal attenuating effects occur in a GPS signal that is initially weak because of energy availability limitations on the host satellite and the distances traversed by the signal. Enhanced sensitivity may be aided in present invention receivers through use of coherent signal integration techniques that may involve for example ten milliseconds of received signal data that is subjected to Fourier transformation filtering in the first coarse transformation of the above recited 1 kilohertz resolution and the second Fourier transformation integration of the 100 Hertz resolution. In the FIG. 1B receiver the Doppler frequency identification accomplished through use of the present invention achieves a determination of which of the possible 100 Hertz frequency bands the incoming signal Doppler component falls within.

Figure 3:
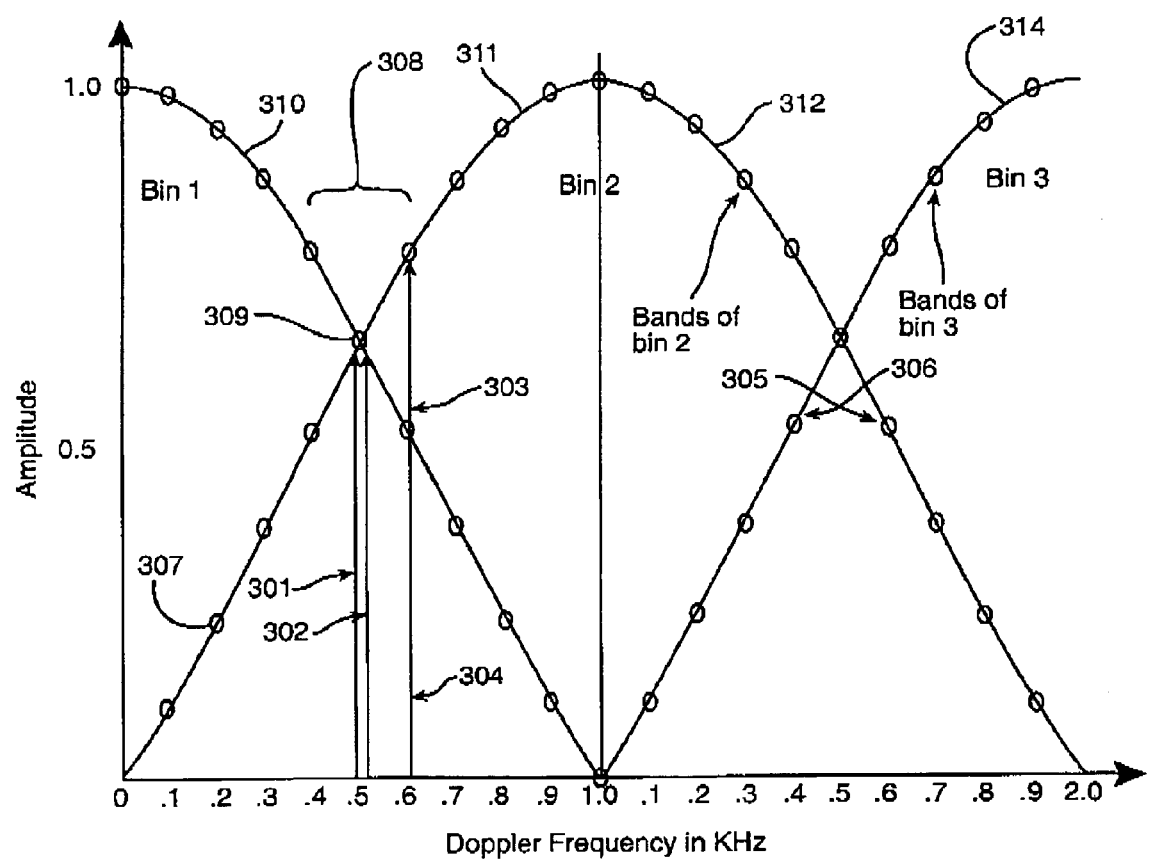
FIG. 3 shows an example of signal filtering accomplished by way of a Fourier transformation filtering arrangement.
Figure 4:
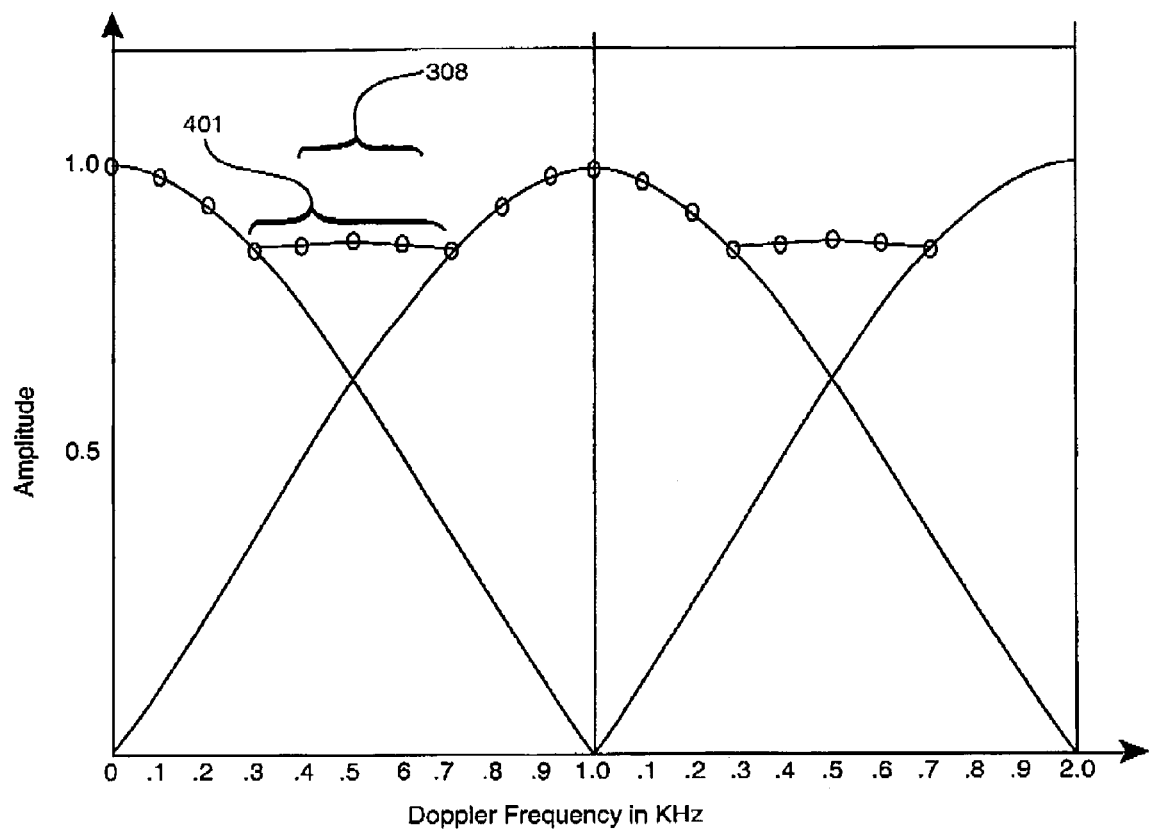
FIG. 4 shows the output of two ten point Fourier transformations according to the present invention.

The first of the Fourier transformation filtering operations on a digitized incoming signal, as accomplished in the block 110 of each FIG. 1 GPS receiver apparatus, thus establishes eleven Doppler frequency intervals that are herein referred-to as "frequency bins", overlapping "bins" of two kilohertz bandwidth, and one kilohertz center to center frequency separation, as are represented in the FIG. 2, FIG. 3 and FIG. 4 drawings. Eleven of these bins exist notwithstanding their 1 kilohertz center frequency separations by way of the first bin commencing at zero Doppler frequency. Three of these achieved eleven bins are represented in each of the latter two of the three drawings and are identified as "Bin 1", "Bin 2" and "Bin 3" in the FIG. 3 diagram of sensitivity versus Doppler frequency.

These eleven bins cover the possible +/−5 kilohertz or 10 kilohertz total Doppler frequency range achievable by the considered relative motions of a satellite and a high performance aircraft as described previously. From the FIG. 2, FIG. 8 and FIG. 4 drawings and the "Bin 1", "Bin 2" and "Bin 3" identifications in FIG. 3 it may be appreciated that this first Fourier transformation operation performed on the incoming GPS signal has in effect accomplished a 1 kilohertz band pass filtering function. Notably however there exists in a receiver sensitivity plot of the general types shown in FIG. 5 and FIG. 6 a number of possible input frequencies, in valleys of the sensitivity waveform, at which undesirable receiver sensitivity decreases exist; more on this later.

The present invention Fourier transformation corrections accomplished in the blocks 112 and 122 of FIG. 1B generate an amplitude corrected frequency components electrical signal as is represented at 124 in FIG. 1B. This corrected signal included both the "bin" and the "band" corrections described herein and may be processed into GPS data signals as is accomplished in the block 126. These signals are subsequently used to operate a GPS signal utilization device, e.g. a display, as the block 128 may be appreciated to represent. Such a display can be part of the described GPS radio receiver or an inherent instrument component in the aircraft discussed earlier herein. Other GPS signal utilization devices including computers are of course known in the electrical art.

Each millisecond of the original ten milliseconds of input signal data thus provides a new set of 1 kilohertz first Fourier transformation filter bin results for a total of eleven of such results, each representable by complex numbers having real and imaginary components. As previously stated in order to further enhance the receiver sensitivity an additional use of the present invention process including an additional Fourier transformation sequence, this time of 100 Hertz resolution, is employed. Each transformation coefficient of this second Fourier transformation defines what is herein identified as a "frequency band" and there are 11×10 or 110 of these frequency bands defined following the second transformation. An identification of frequency band location for an incoming GPS signal together with the previously determined frequency bin location of this signal comprises the sought-after frequency identification operation needed in the "acquisition" of the GPS signal Doppler frequency.

Two problems are addressed by the present invention. A first one of these problems appears following the 1 kilohertz bin frequency first Fourier transformation described above. The second of these problems appears following the band frequency 100 Hertz Fourier transformation and is of a similar but additional nature to the first problem. These problems may be better appreciated from a consideration of the FIG. 5 receiver sensitivity curve. The first of these Fourier transformation problems concerns the fact that upon performance of the 1 kilohertz resolution first Fourier transformation an incoming GPS signal is impressed with a Fourier transformation provided envelope wherein the transformed input signal has a magnitude that is dependent solely upon the signal's frequency location with respect to a Fourier transformation bin center frequency. As a result of this envelope a given magnitude of input signal that is coincident in frequency with a bin center frequency (i.e., is of the same frequency as the frequency of one term in the Fourier series representing the 1 kilohertz transform input signal) will be of greater output magnitude following transformation than would be the same input signal if located at a frequency that is intermediate two Fourier transformation bin centers. For description convenience purposes herein this phenomenon may be identified with the name "center frequency proximate characteristic" or the alternate and previously introduced name of "frequency offset attenuation". The shape of this frequency bin related envelope is that of the envelopes 200 and 202 in the FIG. 2 amplitude versus frequency display and the similar envelopes 310, 312 and 314 in the FIG. 3 amplitude versus frequency display. The appearance of this shape in FIG. 2 is especially informative since this drawing is free of later described details of the invention.

Figure 5:
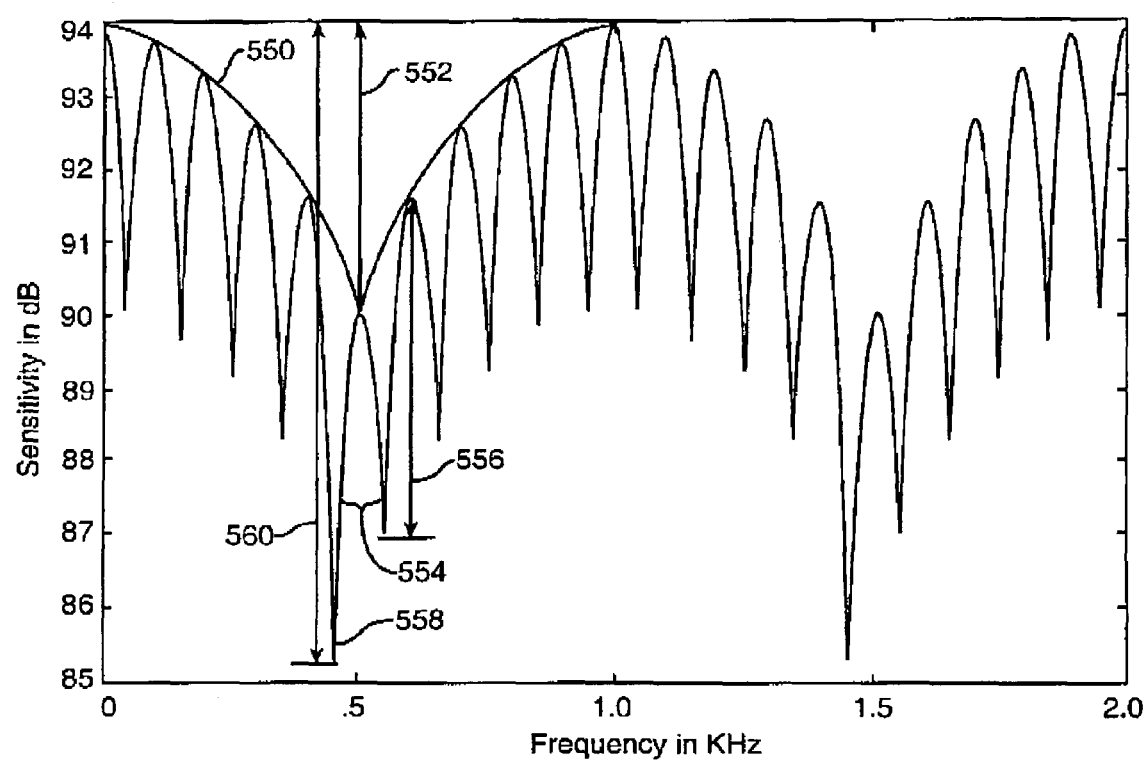
FIG. 5 shows Fourier transformation outputs uncorrected by the present invention.

This "center frequency proximate characteristic" Fourier transformation envelope also appears at 550 in the receiver sensitivity curve of FIG. 5 in the drawings. In the FIG. 5 curve it is interesting to note that the sensitivity decrease indicated at 552 for the portion 554 of the FIG. 5 curve, a maximum possible decrease of some 3.9 decibels, is exclusively caused by the presence of the frequency bin related Fourier transformation envelope 550. A sensitivity decrease of this 3.9 decibels magnitude corresponds of course to more than a half power signal attenuation and is sufficient to cause signal detector missing of a weak GPS signal happening to have the Doppler frequency relating to the curve portion 554 i.e., a Doppler frequency of about 0.5 kilohertz.

The "center frequency proximate characteristic" sensitivity decrease indicated at 552 in the FIG. 5 curve results from only the first of the two Fourier transformation problems of concern in the present invention. The second of these problems is associated with the additional frequency band related sensitivity decrease i.e., the center frequency proximate characteristics, attributable to the second Fourier transformation operation performed herein on an incoming GPS signal. This second Fourier transformation related sensitivity decrease also has a maximum possible magnitude of 3.9 decibels and is represented in FIG. 5 by the sensitivity change at 556. A GPS input signal happening to have the Doppler frequency represented at 558 in the FIG. 5 drawing, a frequency of about 0.45 kilohertz, would therefore be subjected to a combined total of 7.8 decibels of Fourier transformation related possible "center frequency proximate characteristic" sensitivity decrease, a decrease of the magnitude represented at 560 in the FIG. 5 drawing. Clearly a sensitivity decrease of this amount will diminish GPS receiver acquisition performance in all but the strongest of signal environments.

We find that it is possible to avoid much of each Fourier transformation related receiver sensitivity decrease or "center frequency proximate characteristics" represented in the FIG. 5 drawing by way of a judicious signal substitution procedure, a procedure that may be appreciated with reference to the FIG. 3 signal amplitude versus frequency drawing. In the FIG. 3 drawing the effect of the above described first Fourier transformation related frequency bins and their signal diminishing characteristics are represented. The FIG. 3 drawing curves thus show the 1 kilohertz first Fourier transformation output signal levels to be expected from a GPS Doppler signal of constant strength located at any Doppler frequency between 0 kilohertz and 2 kilohertz. Notably this output signal varies in magnitude according to its location with respect to a frequency bin center frequency. Notably also a given GPS input signal generates Fourier transformation output signals that are located in two of the overlapping frequency bins shown in the FIG. 3 drawing. The location of the second Fourier transformation related frequency band center frequencies is also indicated in the FIG. 3 drawing using the oval shaped marks at 307, 305 and 306 for examples. The related band center frequencies of 100 Hertz separation are identified by the numbers between 0.1 and 0.9 on the horizontal scale in FIG. 3. The signal diminishing effects of the second Fourier transformation and its frequency bands are however initially ignored in FIG. 3 for description simplification purposes and because their attenuating effect occurs only after the second Fourier transformation.

In performing the band related second Fourier transformation operation on a received GPS signal a question arises as to which of several possible first transformation coefficients should be used as input data for the second transformation. In the upper portion of the FIG. 3 bin curves 310, 312 and 314 for example it is clear that the larger Fourier transformation coefficients generated by the first transformation are the most representative information available concerning the input signal data. In the valley regions of the FIG. 3 curves such as at 308 however the ability of a first transform coefficient that is artificially reduced in magnitude by center frequency proximate characteristics of the Fourier transformation process to accurately represent the input signal is significantly limited. The recognition of this question has led to our present invention.

Doppler input signals of frequencies located in the valley regions such as 308 in FIG. 3, i.e., signals of Doppler frequencies in the FIG. 3 curve regions of 0.5 kilohertz and 1.5 kilohertz, generate substantially diminished but yet significant first Fourier transformation bin 1 and bin 2 coefficients, as are represented at 301 and 302 in FIG. 3. We therefore suggest using a combination of these diminished bin 1 and bin 2 coefficients from this region as substitutes for the Fourier transformation characteristics-diminished actual first Fourier transformation coefficients when performing the second Fourier transformation in these regions.

Simulation studies have shown that this combination of coefficients is in fact beneficial for several of the first Fourier transformation frequencies located in the attenuated Doppler coefficient regions such as 308 in FIG. 3. The revised FIG. 3 signal amplitude curve appearing in the FIG. 4 drawing shows the results of this coefficient combination improvement to the FIG. 3 curve involving five frequency bins in the region 308.

The manner in which the combination of coefficients or magnitudes such as 301 and 302 in FIG. 3 is accomplished for present invention purposes appears to justify explanation. Since the results of the first Fourier transformation are in fact complex with each transformation term containing real and imaginary components, the most efficient way to combine two such terms is by vectorial addition. A scalar (absolute value) amplitude addition may be substituted for this vectorial addition, however, such a summed quantity is reduced in magnitude and the achieved correction for Fourier transformation center frequency proximate characteristics is thus diminished to a degree.

The bin 2 and bin 1 Fourier transformation coefficients at 301 and 302 in FIG. 3 are of equal magnitudes because the frequency bin center 309 is located substantially half way between the bin 1 and bin 2 center frequencies of 0 kilohertz and 1 kilohertz. The combination of coefficients concept of the present invention is not however limited to this half way frequency location and in fact contemplates use of several combined coefficients located on either side of the frequency bin center 309, coefficients such as those at 303 and 304 where for example the magnitude 303 attributable to bin 2 exceeds that attributable to bin 1. FIG. 4 illustrates the use of four such center frequency-adjacent coefficients having unequal component parts in the corrected first Fourier transformation output.

In order to avoid a degradation of the signal to noise ratio in a transformed GPS signal having a Doppler frequency in the region 308 of FIG. 3 it is desirable to correct the magnitude of the combined coefficients, as achieved by either the vectorial or scalar combining procedures, by a factor recognizing the fact that noise signals combine according to their power. Thus a square root of two factor is used as a divisor to diminish a combined coefficient computed for use in the region 308 in the case of the vectorially combined coefficients.

Thus-far in disclosing the FIG. 4 corrections for center frequency proximate characteristics of a Fourier transformation we have considered only correction of the center frequency proximate characteristics resulting from the first of the two Fourier transformation operations used for filtering in the present GPS receiver environment. The second Fourier transformation operation used in this GPS receiver also produces a center frequency proximate characteristics effect and as noted above adds a possible additional 3.9 decibels of signal diminishing to a Doppler signal that happens to reside intermediate two frequency bands of this second Fourier transformation. In order to correct for this second set of center frequency proximate characteristics (now relating to the frequency bands), i.e., to smooth the higher frequency waveforms appearing in FIGS. 5 through 7, we again suggest using a combination of adjacent frequency determined coefficients as substitutes for the second Fourier transformation coefficients diminished by the center frequency proximate characteristics effect. These band-related combined coefficients of course also include a square root of two noise correction factor as discussed in connection with the bin frequency combined coefficients.

The output of the second Fourier transformation operation in the GPS receiver application of the invention is coupled to a signal detector where a comparison with a measure of signal strength is accomplished. Just as in the first Fourier transformation instance a question arises as to which of several possible second transformation output coefficients should be used for a detector input arises once again. In the case of the second Fourier transformation and the frequency band related coefficients we find that use of the normal second Fourier transformation output coefficient data is again desirable in instances where these coefficients are relatively large and a combination of coefficients from adjacent Fourier transformation frequencies is desirable where the center frequency proximate characteristics effect has caused significant second transformation amplitude decrease. We have determined by simulation that the use of five combination of coefficients values at the center frequencies between bands, as shown in FIG. 5, is an optimum condition and that attempts to use combinations of coefficients at more than these five band frequencies actually detracts from the results available from use of the unadorned Fourier transformation determined coefficient values.

Figure 6:
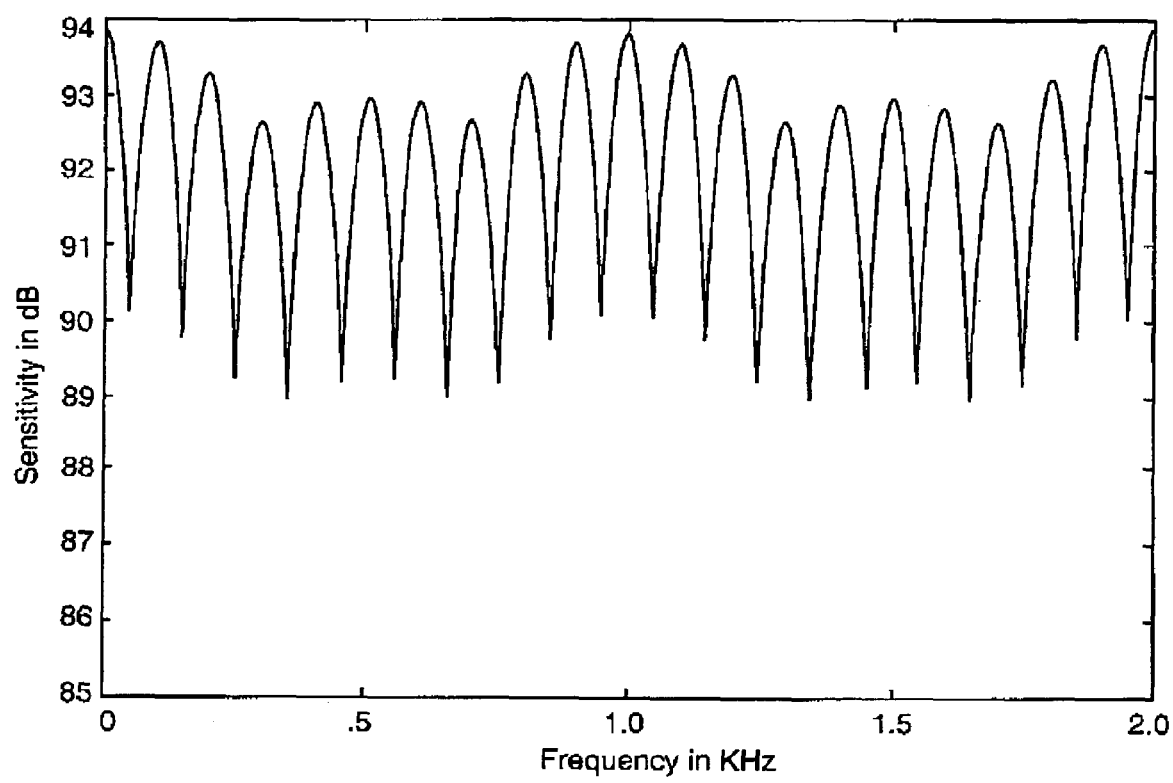
FIG. 6 shows Fourier transformation outputs partly corrected by the present invention.
Figure 7:
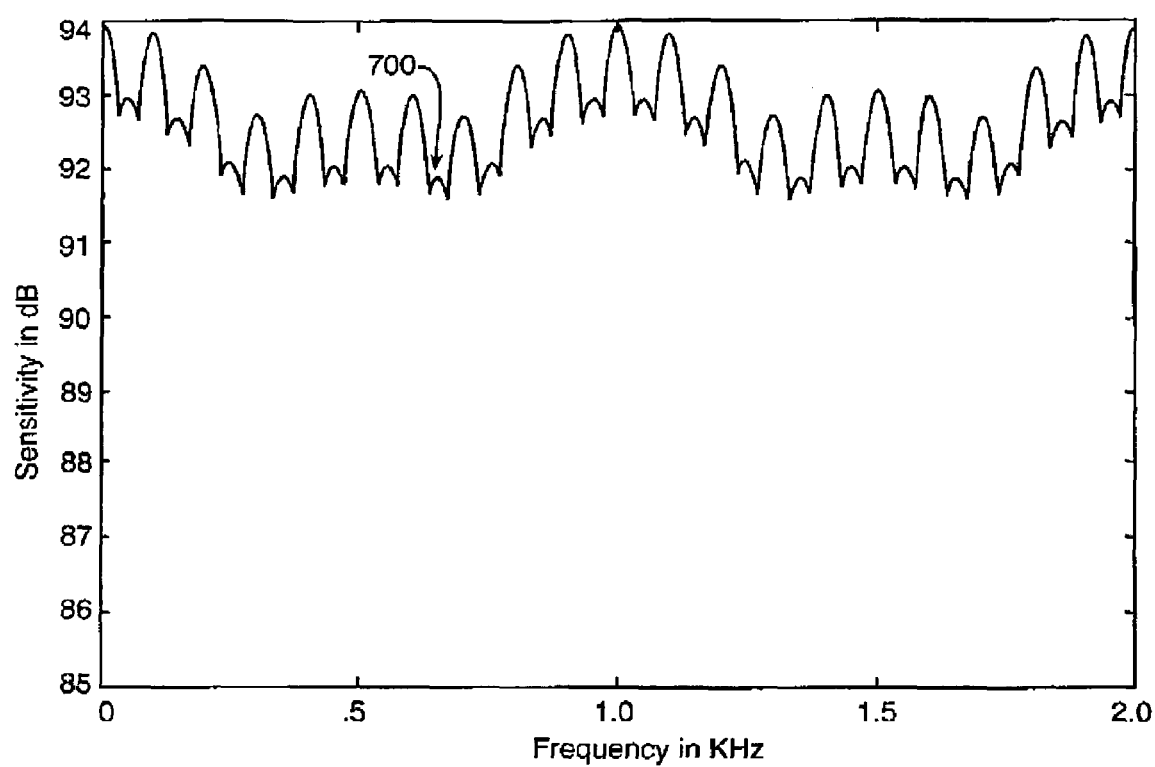
FIG. 7 shows Fourier transformation outputs twice corrected by the present invention.

FIG. 5, FIG. 6 and FIG. 7 in the drawings show a comparison of the uncorrected for "center frequency proximate characteristics" the corrected for bin "center frequency proximate characteristics" and the corrected for bin and band "center frequency proximate characteristics" effects respectively according to the present invention. In FIG. 7 the 7.8 decibels of "center frequency proximate characteristics" appearing in FIG. 5 is corrected to about 2.5 decibels through use of the invention.

With the preceding essentially narrative description of the present invention as background it is believed possible to recite the following additional and reiterative description of the invention while remaining within the bounds of a reasonably comprehensible technical disclosure. This following supplementary description thus repeats portions of the previous description while adding certain detail that were previously omitted for simplification and shortening purposes.

In GPS receiver software, a common approach to search for Doppler frequency is through DFT (Discrete Fourier transformation) signal processing. In the DFT approach, one millisecond of input data may be used to perform ten DFTs with the resulting kernel functions being disposed 1 KHz apart in frequency. The results of the DFT process in the present GPS receiver example are eleven 1 KHz bandwidth band passed integration outputs. These filter bins cover ±5 KHz of Doppler frequency and are thus compatible with the expected Doppler frequency shift of a satellite in orbit and a moving high performance aircraft. Acquisition techniques for C/A code and Doppler frequency in a GPS receiver have been well developed in the art as is disclosed in for example the three hereby incorporated by reference herein publications of D. J. R. VAN NEE and A. J. R. M. COENEN "New Fast GPS Acquisition Technique Using FFT", Electronic Letters 17 Jan. 1991 Vol. 27 No. 2, PP 158-160;

DAVID M LIN and JAMES B. Y. TSUI "Acquisition Schemes for Software GPS Receiver", Proceedings of ION GPS 98" Sep. 15-18, 1998, Part 1, pp. 317-326;

JAMES B. Y. TSUI "Fundaments of global positioning system receivers: a software approach" John Wiley & Sons, New York 2000.

In order to illustrate the advantage of the present invention, we assumed the C/A code in the GPS signal is aligned with locally generated C/A code so that the C/A code of the GPS signal can be stripped off. FIG. 2 in the drawings shows a GPS signal with an input frequency lying somewhere between the center frequencies of two DFT bins for a global position system receiver such as the FIG. 1 receiver 110. In the FIG. 2 drawing the achievable signal amplitude output, for such an input signal between two adjacent frequency bins of the DFT operation at 110 in the FIG. 1 receiver, appear at 200 and 202. These achievable output signals are of course input frequency dependent and decrease in possible magnitude with input frequency separation from the two center frequencies of the adjacent bins located at 210 and 212. The Fourier transformation output to be expected in each of bins 200 and 202 from an input signal located midway between the adjacent bin centers at 210 and 212 is represented at 204. Along the vertical axis 208 in FIG. 2 appears the normalized output amplitude of the DFT operation. The attenuation of the output 204 amplitude to a magnitude of 0.6366 of the magnitude to be expected from outputs at bin centers, such as 210 and 212, is apparent along this axis 208 in the FIG. 2 drawing.

In order to improve GPS receiver sensitivity, ten consecutive results from each FIG. 2 frequency bin are coherently integrated. This coherent integration can be completed by a 10-point FFT (Fast Fourier Transform). The results of the 10-point FFT are 10 frequency band outputs. These frequency band outputs have 100 Hertz resolution. The output in each frequency band is a complex quantity. The center frequencies of the bands in adjacent bins are shown as small circles such as at 305 and 306 in the FIG. 3 drawing. If the frequency of the input GPS signal is centered between two adjacent bins, two adjacent bins produce outputs (e.g. the FIG. 3 output of amplitude 301 for bin 2 and output of amplitude 302 for bin 1) and they are 180 degrees out of phase with respect to each other.

Such out of phase outputs 301 and 302 can be subtracted to achieve their combination as is desired in embodying the present invention. This subtraction is hence equivalent to adding the amplitude of two outputs 301 and 302. With respect to output magnitudes of 1.0 at bin center, the summed output is equal to 1.273 (2×0.6366). The magnitude is double that of the original outputs. The noise component of the two outputs are also added and thus the equivalent amplitude of the noise component is increased only by $\sqrt{2}$. This $\sqrt{2}$ increase is based on the fact that noise signals add in terms of their power. In order to maintain an equivalent signal-to-noise ratio, the summed output signals are therefore divided by $\sqrt{2}$. The resulting equivalent amplitude is 0.90 (1.273/1.414), which corresponds to about a 0.91 dB loss of signal over the bin-centered input frequency situation. With substitution of the summed two bins result for the offset frequency attenuated original results, the described frequency bin procedure can recover about 3 dB of the original offset frequency signal sensitivity loss.

The same procedure can be applied in the case of neighboring frequency bands and the second employed Fourier transformation. Because the phases difference of outputs of the bands gradually departs from the 180 degree out of phase condition, the vector addition and the improvement of interest in the present invention also degrades. However, simulation results yet show an improvement with use of the invention. This invention replaces the original Fourier transformation results with the combined results for five bands in the FIG. 4 drawing. The final combined bands are shown at 401 in FIG. 4.

Sometimes in practice of the present invention, for computational simplicity reasons, instead of using vector addition of the results of the two Fourier transformations at the same frequency as mentioned above, the absolute value of transformation coefficients can be numerically added together to double the single transformation coefficient magnitude. The incoherent processing gain for such summations is about 2.67 dB rather than the 3 decibels obtained with vectorial addition. Such a 2.67 dB gain is provided by the noise component correction of the doubled magnitude bin output and occurs because the noise level is 1.47 times the noise before summation and 20 log(2/1.47)=2.67 dB.

FIG. 5 shows the original sensitivity results and FIG. 6 shows the sensitivity results after the improvement of the first of the two Fourier transformation filtering operations of the present invention. Reduced sensitivity areas continue to exist in the FIG. 6 results when the input frequency falls between Fourier transformation center frequencies. The same principle in a second sequence improves the sensitivity between bands. Assuming the input frequency of the GPS signal is between bands, both adjacent bands produce results and they are 0.6366 of the magnitude to be expected at exactly two band center frequencies. Just as in the bin frequency case mentioned above, the outputs of these adjacent bands are complex and 180 degrees out of phase. The subtraction of two adjacent band outputs and dividing by $\sqrt{2}$ can produce an enhanced equivalent amplitude of 0.9. With substitution of summed two adjacent bands result for the offset frequency attenuated original results, the second combination procedure can additionally recover about 3 dB of the original offset frequency signal sensitivity loss. If the frequency is not exactly in the middle of the bands, the results will again decrease as the frequency departs. The worst case is when the input GPS frequency is exactly at one of the bands. In this case, the subtraction operation increase is a zero signal amplitude increase but with doubled noise.

Therefore, in the frequency acquisition process, both the original 10-point FFT results and the adjacent band subtraction results are maintained for band-to-band comparison. The higher amplitude will be selected as the band result. FIG. 7 shows the combined results which also is the final result after bin and band corrections according to the present invention are accomplished.

The mathematical functions described in connection with performing the present invention frequency offset corrections may be embodied in either software or hardware form depending on time considerations and other companion apparatus details.

Although the present invention is disclosed by way of a GPS receiver example, the invention is believed also relevant to other uses of the Fourier transformation since the "center frequency proximate characteristic" is encountered in any Fourier transformation related system, including systems other than a GPS receiver.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. The method of recovering electrical signal amplitude loss arising from frequency offset between a GPS electrical input signal and a bin center coefficient frequency of an electrical signal Fourier transformation frequency filtering operation applied to said GPS electrical input signal, said method comprising the steps of:

performing an electrical signal Fourier transformation operation on said GPS electrical input signal to obtain a plurality of GPS input signal Fourier transformation coefficient electrical signals each relevant to a different Fourier transformation exponential term and a different bin center frequency in a plurality of overlapping Fourier transformation frequency bins defined by a corresponding plurality of said exponential terms; and substituting for a selected GPS input signal Fourier transformation coefficient electrical signal relating to an exponential term located in adjacent pairs of said overlapping Fourier transformation frequency bins, in a selected intermediate frequency location between two adjacent of said bin center frequencies, a substitute coefficient electrical signal determined from a combination of coefficient electrical signals relating to said exponential term located in adjacent pairs of said overlapping Fourier transformation frequency bins and to said GPS electrical input signal;

communicating electrical output signals relating to said substitute coefficient electrical signal to one of an electrical signal responsive GPS data display and a GPS data utilization device.

2. The method of recovering electrical signal amplitude loss of claim 1 wherein:

said coefficients relating to said exponential term located in adjacent pairs of said overlapping Fourier transformation frequency bins are out of phase electrical signals; and said computed substitute coefficient electrical signal includes a vectorial combination of said out of phase electrical signals.

3. The method of recovering electrical signal amplitude loss of claim 1 wherein:

said plurality of GPS input signal Fourier transformation coefficient electrical signals and said Fourier transformation exponential terms comprise a GPS electrical output signal of said Fourier transformation and wherein said GPS electrical output signal is subjected to the additional steps of:

performing a second Fourier transformation operation on said GPS electrical output signal to obtain a plurality of GPS output signal second Fourier transformation coefficient electrical signals each relevant to a different GPS second Fourier transformation exponential term and a different band center frequency in a plurality of GPS overlapping second Fourier transformation frequency bands defined by a corresponding plurality of said second Fourier transformation exponential terms;

substituting for each GPS electrical output signal Fourier transformation coefficient relating to a second GPS Fourier transformation exponential term located in adjacent pairs of said overlapping second Fourier transformation frequency bands, in selected GPS intermediate frequency locations central between two adjacent of said band center frequencies, a substitute coefficient GPS electrical signal computed from a combination of said coefficient electrical signals relating to said exponential term located in adjacent pairs of said overlapping second Fourier transformation frequency bands and to said electrical output signal to generate a second electrical output signal;

said step of communicating electrical output signals relating to said substitute coefficient GPS electrical signal to one of an electrical signal responsive data display and data utilization device includes communicating said second electrical output signal to one of said GPS electrical signal responsive GPS data display and said data utilization device.

4. The method of recovering electrical signal amplitude loss of claim 3 wherein said frequency bin substituting steps and said frequency band substituting steps each comprise portions of GPS signal amplitude recovery of between 2.67 and 3.0 decibels of offset frequency related signal loss and between 5.34 and 6.0 decibels of total signal amplitude recovery.

5. The method of recovering electrical signal amplitude loss of claim 1 wherein said coefficients relating to said exponential term located in adjacent pairs of said overlapping Fourier transformation frequency bins are equal in magnitude and said selected intermediate frequency between two adjacent of said bin center frequencies comprise a single frequency equally disposed from each of said adjacent pairs of overlapping Fourier transformation frequency bins.

6. The method of recovering electrical signal amplitude loss of claim 1 wherein said selected intermediate frequencies between two adjacent of said bin center frequencies comprise five selected intermediate frequency locations between two adjacent of said bin center frequency locations.

7. The method of recovering electrical signal amplitude loss of claim 1 wherein:
said coefficient electrical signals relating to said exponential term located in adjacent pairs of said overlapping Fourier transformation frequency bins are out of phase electrical signals; and
said substitute coefficient electrical signal determined from a combination of coefficient electrical signals relating to said exponential term located in adjacent pairs of said overlapping Fourier transformation frequency bins includes a scalar combination of said out of phase electrical signals.

8. Fourier transformation GPS electrical input signal processing apparatus having compensated GPS electrical input signal frequency to Fourier transformation term frequency offset-induced transformation term attenuation, said apparatus comprising the combination of:
an embodied Fourier transformation filter connected to said GPS electrical input signal and determining terms of a Fourier transformation series GPS electrical output signal wherein each series term defines a bin center frequency in an array of Fourier transformation overlapping frequency bins;
each term of said Fourier transformation series including a coefficient signal of magnitude determined by said GPS electrical input signal strength and also of magnitude determined by a frequency offset responsive bin relationship between said GPS electrical input signal frequency and frequencies of a most adjacent pair of said Fourier transformation series terms; and
signal combining apparatus responsive to a coefficient portion of said Fourier transformation series terms disposed at frequencies proximate said GPS electrical input signal frequency, in two adjacent of said frequency bins;
said signal combining apparatus generating corrected replacement larger Fourier transformation coefficient GPS signals usable for enhanced accuracy transform representation of GPS electrical input signal coefficients located intermediate said most adjacent pair of Fourier transformation terms bin center frequencies;
data display apparatus responsive to said corrected replacement larger Fourier transformation coefficient GPS signals and in visual communication with a user of said GPS electrical input signal processing apparatus.

9. The Fourier transformation GPS electrical input signal processing apparatus of claim 8 wherein said input signal frequency to Fourier transformation term frequency offset-induced, periodic, transformation term attenuation has a maximum magnitude of 3.9 decibels within a single Fourier transformation filter.

10. The Fourier transformation GPS electrical input signal processing apparatus of claim 8 wherein said corrected replacement larger Fourier transformation coefficient electrical signal further includes a signal power to noise power determined magnitude correction factor.

11. The Fourier transformation GPS electrical input signal processing apparatus of claim 10 wherein said corrected replacement larger Fourier transformation coefficient electrical signal power to noise power determined magnitude correction factor includes a correction factor of square root of two magnitude.

12. The Fourier transformation GPS electrical input signal processing apparatus of claim 8 wherein said electrical signal combining apparatus includes one of a scalar and a vectorial coefficient signal combining generating said corrected replacement Fourier transformation bin frequency coefficient.

13. The Fourier transformation GPS electrical input signal processing apparatus of claim 8 wherein said coefficient portion of one of said Fourier transformation series terms is mathematically complex, including real and imaginary components and said coefficient magnitude combining apparatus includes a vectorial combining.

14. The Fourier transformation GPS electrical input signal processing apparatus of claim 8 wherein said most adjacent pair of said Fourier transformation bin frequencies comprise a bin frequency located just above said GPS electrical input signal and a bin frequency located just below said GPS electrical input signal in frequency.

15. The Fourier transformation GPS electrical input signal processing apparatus of claim 8 wherein said corrected replacement Fourier transformation bin frequency coefficient signal has a coefficient magnitude greater than either of said most adjacent Fourier transformation bin frequency coefficients.

16. The Fourier transformation electrical input signal processing apparatus of claim 8 wherein said apparatus further includes a second embodied Fourier transformation filter determining terms of a second Fourier transformation series wherein each term defines a band center frequency in an array of Fourier transformation overlapping frequency bands.

17. Fourier transformation GPS electrical input signal-processing apparatus having compensated doubly periodic GPS electrical input signal frequency to Fourier transformation term frequency offset-induced transformation term attenuation, said apparatus comprising the combination of:
a first embodied Fourier transformation filter connected to said GPS electrical input signal and determining terms of a first Fourier transformation series GPS electrical output signal wherein each series term defines a bin center frequency in an array of first Fourier transformation overlapping frequency bins;
each term of said first Fourier transformation series including a coefficient signal of magnitude determined by said GPS electrical input signal strength and also of magnitude determined by a frequency offset responsive bin waveform defining a relationship between said GPS electrical input signal and a most adjacent pair of said first Fourier transformation terms;
signal combining apparatus responsive to a coefficient portion of one of said first Fourier transformation series terms appearing at a single frequency, proximate said GPS electrical input signal frequency, in each of two adjacent of said frequency bins;
said signal combining apparatus generating a corrected replacement larger first Fourier transformation coefficient usable for enhanced accuracy transform representation of a GPS electrical input signal coefficient located intermediate said most adjacent pair of first Fourier transformation terms bin center frequencies;
a second embodied Fourier transformation filter connected to a determined GPS output signal of said embodied first Fourier transformation filter and determining terms of a second Fourier transformation series wherein each series term defines a center band frequency in an array of second Fourier transformation overlapping frequency bands;

each term of said second Fourier transformation series including a coefficient signal of magnitude determined by said first Fourier transformation determined GPS electrical output signal strength and also of magnitude determined by a frequency offset responsive band waveform defining a relationship between said first Fourier transformation determined GPS electrical output signal and a most adjacent pair of second Fourier transformation terms; and second signal combining apparatus responsive to a coefficient portion of one of said second Fourier transformation series terms appearing at a single frequency, proximate said second Fourier transformation determined electrical output, in each of two adjacent of said second Fourier transformation overlapping frequency bands;

said second signal combining apparatus generating a corrected replacement larger second Fourier transformation coefficient usable for enhanced accuracy second transform representation of an determined output coefficient located intermediate said most adjacent pair of second Fourier transformation terms band center frequencies; and data display apparatus connected to a GPS output signal determined by said embodied Fourier transformation filters and responsive to said corrected replacement larger transformation coefficients.

18. The Fourier transformation GPS electrical input signal processing apparatus having compensated doubly periodic input signal frequency to Fourier transformation term frequency offset-induced transformation term attenuation of claim 17 wherein said bin waveform and said band waveform each contribute to a frequency responsive input signal attenuation of between zero and 3.9 decibels magnitude.

19. Fourier transformation GPS electrical input signal processing apparatus comprising the combination of:

Fourier transformation electrical circuit means connected with said GPS electrical input signal for generating a plurality of Fourier transformation coefficient signals each relating to a GPS Fourier transformation output frequency and each responsive to both said electrical input signal and to frequency offset between said GPS electrical input signal frequency and frequency of adjacent respective GPS Fourier transformation output frequency signals;

Fourier transformation signal correction electrical circuit means for computing replacement coefficients for Fourier transformation coefficients related to Fourier transformation output frequencies adjacent but offset in frequency from said GPS electrical input signal frequency;

said replacement coefficients each having a magnitude determined by a mathematical combination of adjacent but offset in frequency Fourier transformation coefficient magnitudes;

data utilization apparatus responsive to a generated, said replacement coefficient inclusive, output signal of said Fourier transformation electrical circuit means.

20. The Fourier transformation GPS electrical input signal processing apparatus of claim 19 wherein said mathematical combination comprises a vectorial summation of complex Fourier transformation coefficients.

21. The method of recovering electrical signal amplitude loss arising from frequency offset between a noise inclusive GPS system electrical input signal and a bin center coefficient frequency of an electrical signal Fourier transformation frequency filtering operation applied to said input signal, said method comprising the steps of:

performing an electrical signal Fourier transformation operation on said noise inclusive GPS system electrical input signal to obtain a plurality of input signal Fourier transformation coefficient electrical signals each relevant to a different Fourier transformation exponential term and a different bin center frequency in a plurality of overlapping Fourier transformation frequency bins defined by a corresponding plurality of said exponential terms;

substituting for a selected input signal Fourier transformation coefficient electrical signal relating to an exponential term located in adjacent pairs of said overlapping Fourier transformation frequency bins, in a selected intermediate frequency location between two adjacent of said bin center frequencies, a substitute coefficient electrical signal determined from a combination of coefficient electrical signals relating to said exponential term located in adjacent pairs of said overlapping Fourier transformation frequency bins and to said electrical input signal; and said substituting step including a noise correction mathematical operation performed on said computed substitute coefficient electrical signal.

22. The method of recovering electrical signal amplitude loss arising from frequency offset between a GPS electrical input signal and a bin center coefficient frequency of an electrical signal Fourier transformation frequency filtering operation applied to said GPS electrical input signal, said method comprising the steps of:

performing an electrical signal Fourier transformation operation on said GPS electrical input signal to obtain a plurality of GPS input signal Fourier transformation coefficient electrical signals each relevant to a different Fourier transformation exponential term and a different bin center frequency in a plurality of overlapping Fourier transformation frequency bins defined by a corresponding plurality of said exponential terms; and substituting for a selected GPS input signal Fourier transformation coefficient electrical signal relating to an exponential term located in adjacent pairs of said overlapping Fourier transformation frequency bins, in a selected intermediate frequency location between two adjacent of said bin center frequencies, a substitute coefficient electrical signal determined from a combination of coefficient electrical signals relating to said exponential term located in adjacent pairs of said overlapping Fourier transformation frequency bins and to said GPS electrical input signal;

communicating electrical output signals relating to said substitute coefficient electrical signal to one of an electrical signal responsive GPS data display and a GPS data utilization device;

said one of an electrical signal responsive GPS data determined display and a GPS data utilization device being a selected one of a radio receiver GPS output signal determined display and an aircraft mounted GPS signal determined display.

* * * * *